(12) United States Patent
Wang et al.

(10) Patent No.: US 6,643,075 B2
(45) Date of Patent: Nov. 4, 2003

(54) REENTRANT-WALLED OPTICAL SYSTEM TEMPLATE AND PROCESS FOR OPTICAL SYSTEM FABRICATION USING SAME

(75) Inventors: Xiaomei Wang, Winchester, MA (US); Peter S. Whitney, Lexington, MA (US); Steven F. Nagle, Cambridge, MA (US); Dale C. Flanders, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/878,800

(22) Filed: Jun. 11, 2001

(65) Prior Publication Data

US 2002/0186477 A1 Dec. 12, 2002

(51) Int. Cl.[7] ................................................ G02B 7/02
(52) U.S. Cl. ....................................... 359/811; 359/819
(58) Field of Search ................................. 359/811, 819

(56) References Cited

U.S. PATENT DOCUMENTS

| | | | | |
|---|---|---|---|---|
| 5,311,404 A | * | 5/1994 | Trask et al. ................. | 361/762 |
| 5,518,674 A | * | 5/1996 | Powell et al. ................. | 264/104 |
| 6,227,724 B1 | * | 5/2001 | Verdiell ........................ | 385/91 |
| 6,282,036 B1 | * | 8/2001 | Woytassek et al. ......... | 359/822 |
| 6,339,253 B1 | * | 1/2002 | Corisis ........................ | 257/676 |
| 6,376,277 B2 | * | 4/2002 | Corisis ........................ | 438/106 |

\* cited by examiner

*Primary Examiner*—Ricky Mack
*Assistant Examiner*—Brandi Thomas
(74) *Attorney, Agent, or Firm*—J Grant Houston (57) ABSTRACT

An optical system assembly technique utilizes a templating system for locating optical components 200 on optical benches 150. Specifically, the template system comprises a template substrate 102 that is placed over the optical bench. The substrate 102 has at least one alignment slot 104 that is formed through the substrate. This alignment slot 104 has an alignment feature 120, against which an optical component 200 is registered. In order to improve the accuracy of the alignment of the optical component on the optical bench, the slot 104 has a reentrant, such as a smooth or step, sidewall 106 extending from the alignment feature 120 into the template substrate 102. This way, there is a single point or near single point of contact between the optical component 200 and the template 102, to thereby improve the placement precision for the optical component on the optical bench 150.

22 Claims, 7 Drawing Sheets

REENTRANT-WALLED OPTICAL SYSTEM TEMPLATE AND PROCESS FOR OPTICAL SYSTEM FABRICATION USING SAME

BACKGROUND OF THE INVENTION

Hybrid integrated optical system manufacture uses a number of techniques to install the optical components on an optical bench or submount. Generally, the techniques must be applicable to solder bonding the usually small, i.e., few millimeters square and smaller, and typically delicate optical components.

One technique includes templating. Optical component slots are formed in a metal or graphite template substrate. The template is placed over the optical bench and the optical components are then installed on the bench for subsequent solder attachment. Generally, templating is most applicable to the installation of optical components requiring a relatively low alignment precision. For example, it is commonly used to attach components, such as thermistors, to the optical bench top.

Another common approach relies on precision pick-and-place machines, which are typically variants of flip chip bonders. They can place optical components to precisions of between 2 and 10 micrometers and then solder attach the optical components in place.

SUMMARY OF THE INVENTION

The problem with using pick-and-place machines to assemble the optical systems is that the placement precision is still not that required for many micro-optical systems. Moreover, the bonders are expensive instruments, and the assembly speed is relatively slow since the installation and bonding of the optical components occurs in a serial fashion.

The present invention concerns an optical system assembly technique that is compatible with a batch assembly process. Specifically, at least the bonding processes for the optical components can be performed in parallel, rather than serially as in most bonders, to thereby decrease the per unit assembly times.

In general, according to one aspect, the present invention features a templating system that is applicable to optical systems constructed from bonded optical benches and optical components. Specifically, the template system comprises a template substrate that is placed over the optical bench. The substrate has at least one alignment slot that is formed through the substrate. This alignment slot has an alignment feature against which an optical component is registered.

According to the invention, in order to improve the accuracy of the alignment of the optical component on the optical bench, the slot has a reentrant sidewall extending from the alignment feature into the substrate. This way, there is a single point or near single point of contact between the optical component and the template, to thereby improve the placement precision for the optical component on the optical bench.

Moreover, when the slot is formed using photolithography-based etch processes, the position of the feature can be specified with a high degree of precision, especially when it is located on the side of the substrate adjacent to the patterning resist. A combination of anisotropic and isotropic etches can be utilized to form slope of the reentrant sidewall. In another implementation, a modified deep reactive ion etch (DRIE), or Bosch, process is used where the periodicity of sidewall passivation is varied to obtain the reentrant sidewalls.

In the current implementation, the optical component sometimes comprises an optical element such as a lens, filter, mirror, or a microelectromechanical system (MEMS) device in combination with a mounting structure. In one example, this mounting structure has at least one armature, possibly including a discrete flexure, enabling plastic deformation of the alignment structure to align the optical element relative to the optical system.

In the preferred embodiment, the optical components are metal bonded to the bench. Specifically, metal bond pads are preferably deposited on the bench. Bond pads typically comprise a solder alloy, typically including gold. This yields a mechanically robust connection.

Further, according to the preferred embodiment, an electrical via is provided in the substrate. This is commonly required when the substrate is not subsequently removed from the optical bench prior to testing or final deployment in its intended application. The electrical via provides access to electrical traces on the bench.

In one implementation, the electrical via is simply a hole in the substrate that is aligned over wire bond pads in the optical bench. In an alternative implementation, the electrical via comprises a conductive path either through the substrate, in the form of an inter-metalization layer titanium plug as used in the conductor chips, for example, or electrical traces that are deposited on the outer surface of the substrate.

In general, according to another aspect, the invention features a process for fabricating an optical system. This process comprises depositing a bond pad on the optical bench. The deposition can either be performed using photolithographic/liftoff processes or by solder preform placement. Further, a substrate is installed over the optical bench. Alignment slots are formed in the substrate.

The order in which the bond pad deposition, substrate installation, and alignment slot formation steps are performed depends on the implementation. For example, in one implementation, the installation step is performed before slot formation. The bond pads can be deposited either before the substrate installation or after the slot formation. In contrast, in another implementation, the substrate installation step is first performed after the alignment slot formation. Bond pad deposition can occur either before the installation step or after the slot formation step.

In any event, the alignment slots are formed with an alignment feature that projects into the slot from the slot's sidewall. The optical component is then inserted into the slot and onto the bond pad. The optical component is registered against the alignment feature of the substrate.

Of note is the fact that the present implementation is compatible with wafer-level integration. Specifically, a wafer of substrates is bonded to a wafer of optical benches, using fusion bonding or metal bonding (solder, thermocompression, or ultrasonic), for example. Optical components can also be installed at the wafer level. Only after the optical components have been installed and bonded to the bench is the optical bench wafer singulated into individual optical benches.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
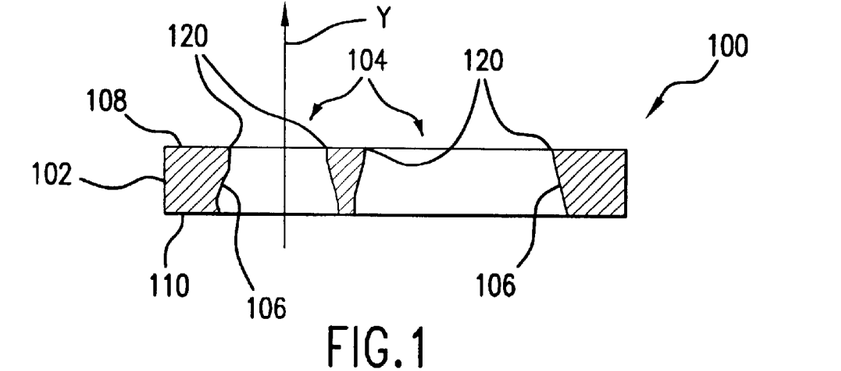
FIG. 1 is a cross-sectional view of a template substrate with reentrant sidewalls according to the present invention.

FIG. 1 shows an optical template substrate 100, which has been constructed according to the principles of the present invention.

Specifically, the template substrate 100 comprises bulk material 102 and alignment slots 104 that have been formed through the bulk material 102.

According to the present invention, the alignment slots 104 have at least one re-entrant sidewall 106. These reentrant sidewalls 106 extend into the bulk material relative to a vertical axis Y that is orthogonal to the planes of the top surface 108 and/or the bottom surface 110 of the template substrate 100.

The reentrant sidewalls 106 of the slots 104 yield alignment features 120 that project into the slot 104. These alignment features are used as the registration features to locate optical components in the slots 104.

Figure 2:
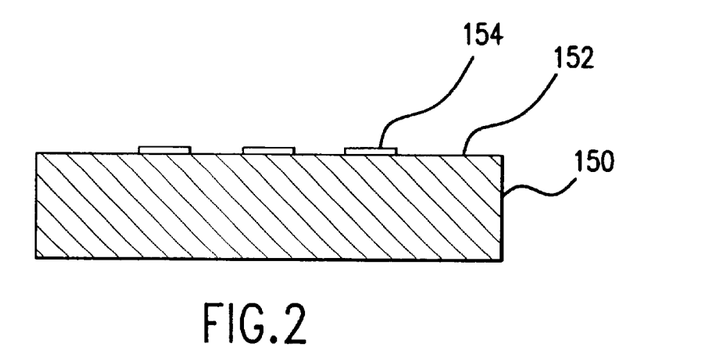
FIG. 2 is a cross-sectional view of an optical bench with bond pads.

FIG. 2 illustrates an exemplary optical bench 150. Optical bench 150 has a top surface 152 onto which bond pads 154 have been deposited. The pads comprise gold/tin solder in one implementation with underlying adhesion and barrier layers such as titanium and platinum, respectively.

The bond pads 154 are deposited on the top surface 152 of the optical bench 150 via a photolithographically controlled process, such as a lift-off process or sonic thin-film deposition process, for example. Alternatively, the deposition can comprise simply placing a solder preform onto the top surface 152.

Figure 3:
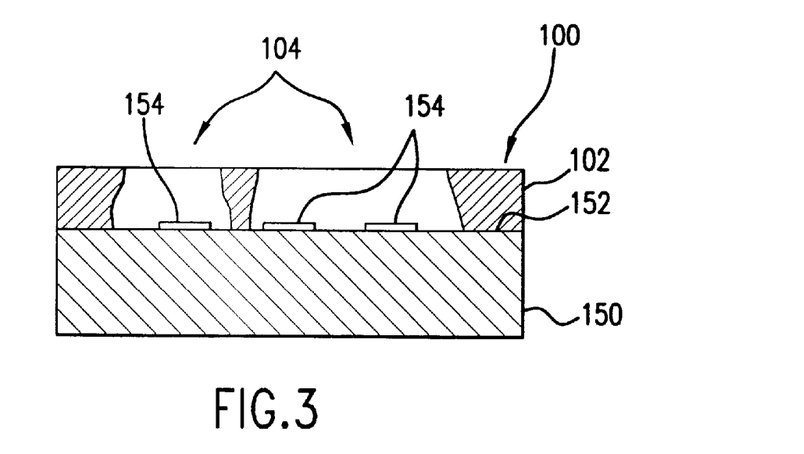
FIG. 3 is a cross-sectional view showing the installation of the template substrate on the optical bench according to the invention.

FIG. 3 shows the template substrate 100 installed on the top surface 152 of the optical bench 150. The slots 104 are typically located over the bond pads 154.

Figure 4:
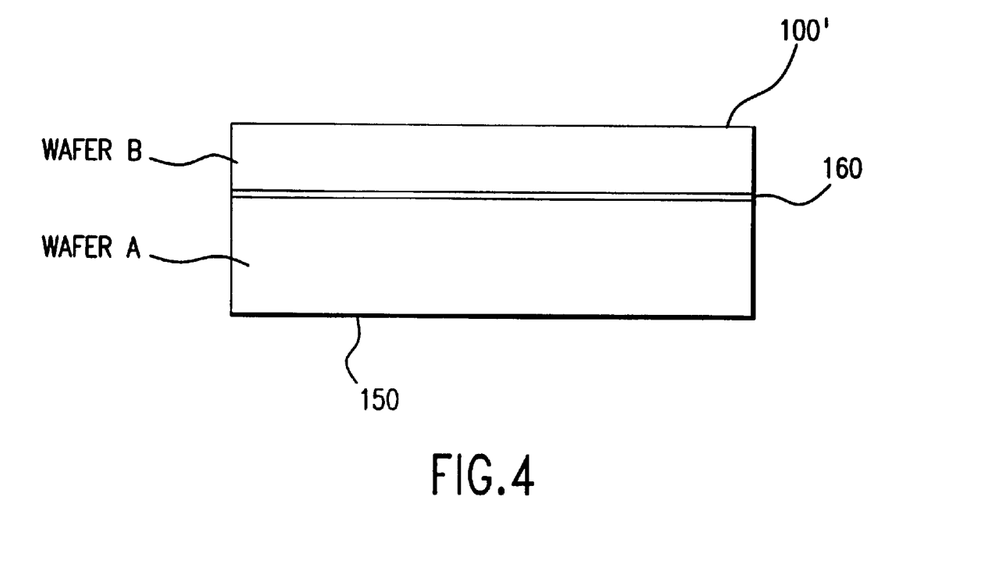
FIG. 4 shows silicon-on-insulator (SOI) wafer system with the intervening oxide or etch-stop layer prior to slot patterning of the template substrate.

In an alternative embodiment illustrated in FIG. 4, rather than assembling the patterned bulk material 102 of the template 100 on the optical bench, composite structure, such as thermally bonded silicon on insulator (SOI) is used as the precursor material. In this example, wafer B is used to manufacture template substrates, with wafer A functioning as a wafer of the optical benches 150. An intervening etch stop layer 160 is provided between wafer A and wafer B to facilitate the patterning of the slots into wafer A. Etch stop layer 160, in exemplary SOI structure, is silicon oxide.

This composite structure allows for the patterning of the slots 104 directly into wafer B to fabricate the template substrate 100. In one example, this is performed by reactive ion etching (RIE) or deep reactive ion etching (DRIE).

The advantage associated with using RIE, or a variant, concerns the fact that the profile of the sidewalls can be controlled to a relatively high degree of precision. For example, the Bosch DRIE process involves repeated exposure of a photoresist-masked silicon wafer to an etchant ($SF_6+C_4F_8$, for example) plasma in alternation with a passivant ($C_4F_8$, for example) plasma. Sidewall profile control requires characterization of the effects of variations in photoresist and DRIE process parameters, such as power levels of the plasma apparatus in the etching and passivating steps, the durations of these steps, the total number of etching-and-passivating cycles, and the pressures and rates of flow of the $SF_6$ and $C_4F_8$ gases.

According to the Bosch process, a very short distance is etched into the silicon, then the entire surface is passivated with a substance that is resistant to the etch gas. During the next etch cycle, the passivant is etched preferentially on horizontal surfaces. The basic method maintains the lengths of time that each cycle is active throughout the etch. This is one reason that very vertical sidewalls are produced using the Bosch process.

The reentrant sidewalls in the present invention are produced, in one example, by extending the etchant exposure step with increases in the etched slot depth in the wafer substrate. The progressively longer etch steps with fixed length passivation steps yields increased undercutting with etch depth. This results in a slanted but generally straight sidewall as illustrated.

In another example, a step-reentrant sidewall is produced by using a few long etch steps at a mid-point in the etch process or by using a combination of anisotropic etch process such as DRIE in combination with an isotropic silicon etch, for example.

In any event, the alignment features 120, at the top of the sidewalls 104, however, are very precisely defined by the adjoining resist patterning material, which is used to define the slots 104.

Figure 5:
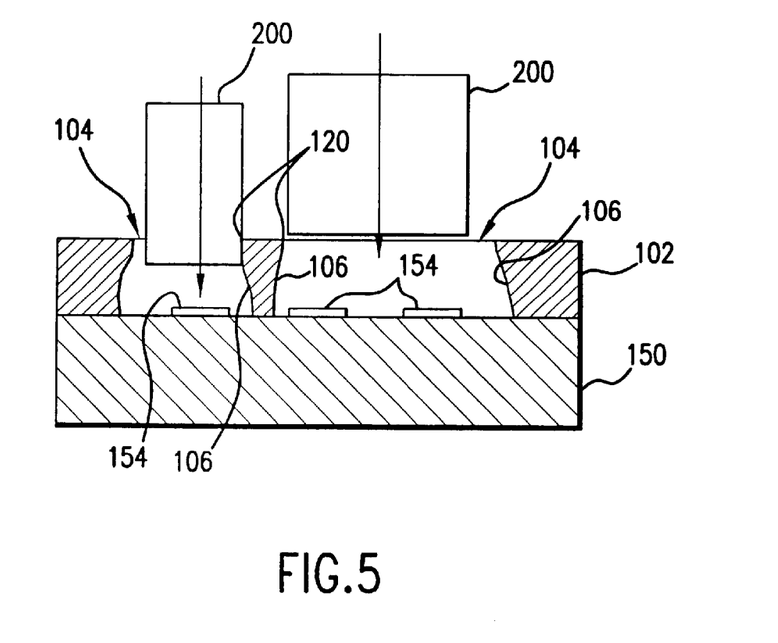
FIG. 5 shows the installation of optical components into the slots of the template substrate according to the present invention.

FIG. 5 illustrates the optical system assembly step. Specifically, optical components 100 are inserted into the slots 104 and placed on top of the bond pads 154.

During or after the insertion step, the optical components 200 are registered against the alignment features 120.

In one implementation, the optical components 200 are inserted into the slots 104 in contact with the alignment features 120. In other implementations, the optical components 200 are inserted into slots 104 and then registered against the alignment features 120.

In one specific example, this registration is performed using self-alignment initiated by solder surface tension of the bond pads 154 during a solder reflow step.

FIGS. 6–9 illustrate the application of the present invention to fabricate an optical channel monitor optical system. This system comprises a combination of passive optical elements such as lenses l, filters f, and an isolator i and optoelectronic components such as a semiconductor light emitting structures ld, a MEMS optical filter tf, and optoelectronic detectors d.

Figure 6:
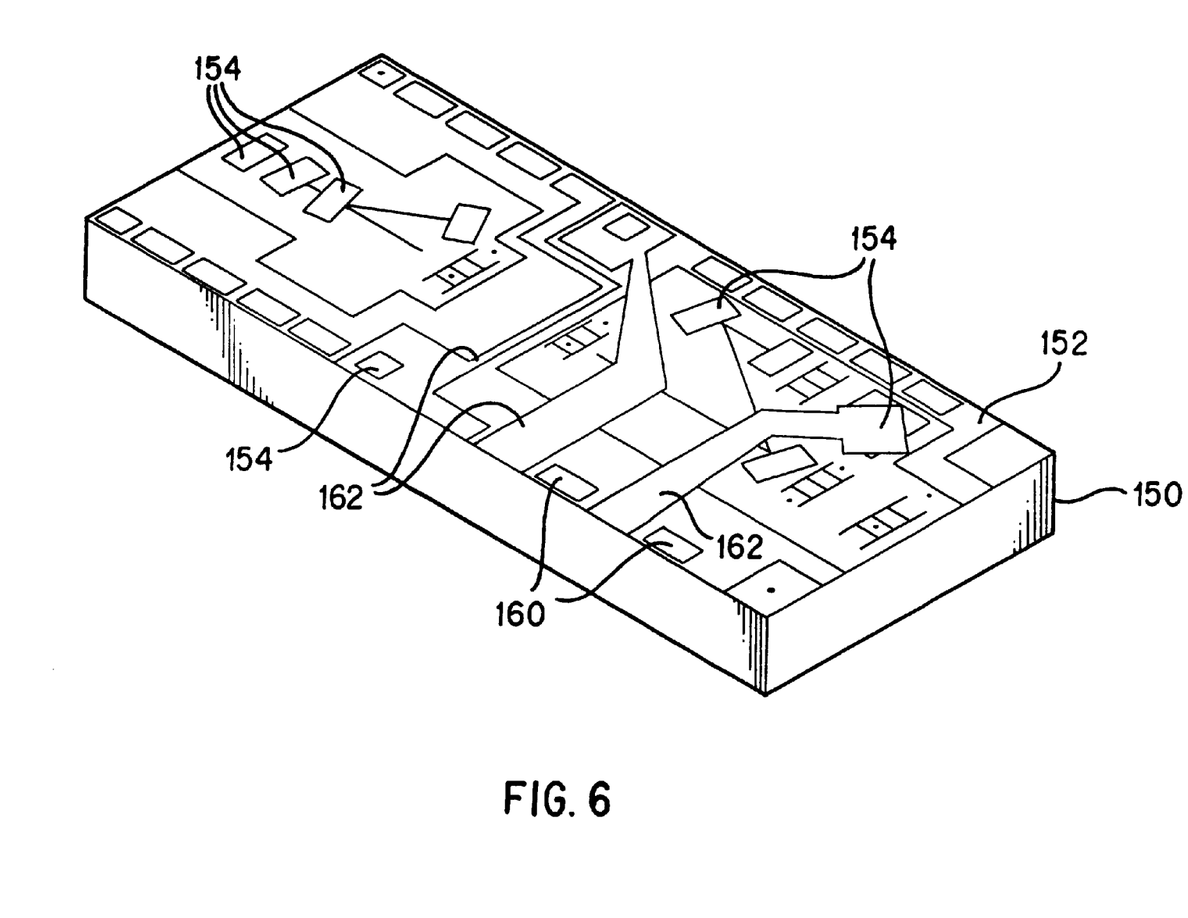
FIG. 6 is a perspective view of an exemplary optical bench.

In more detail, FIG. 6 shows an unpopulated optical bench 150. In the illustrated example, the top surface 152 comprises predeposited, metal bond pads 154. Also provided are electrical wire bond pads 160, to which wires, for example, are bonded to enable electrical connection to the optical components on the optical bench via metal traces 162.

Figure 7:
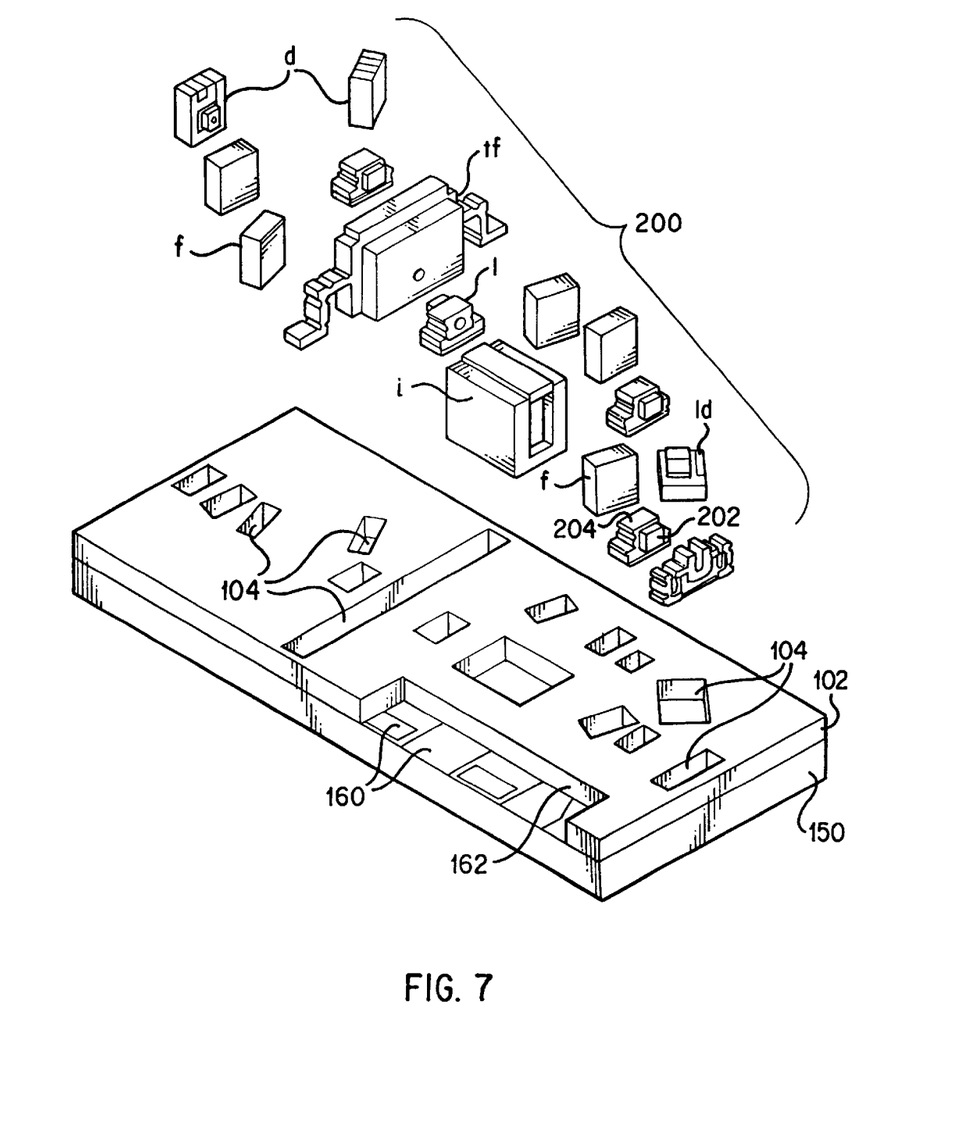
FIG. 7 is a perspective view of an exemplary optical bench with a template substrate and various optical components, which are ready for installation according to the invention.

As illustrated in FIG. 7, the template substrate 102 is installed on the optical bench 150. It has slots 104 corresponding to the intended placement locations of optical components 200. In the illustrated example, these optical components comprise, for example, detectors d, filters f, MEMS tunable filters tf, isolators i, and lenses l. In more detail, the lens optical component l, in the illustrated example, comprises a lens substrate 202 and a metal deformable mounting structure 204. In an example, the lens substrates 202 are thermocompression bonded to the mounting structures 204.

In the illustrated example, an electrical via 162 is also provided in the template substrate 102 over the electrical wire bond pads 160.

In one embodiment, the template substrate 102 is never removed from the optical bench 150, even after deployment and commercial operation in its intended application. In an alternative example, the template substrate 102 is removed after the installation of the optical components 200 on the top surface 152 of the bench 150. In this later example, the provision for the electrical via 162 is still important to allow testing of the optical system immediately after assembly and possibly during alignment.

Figure 8:
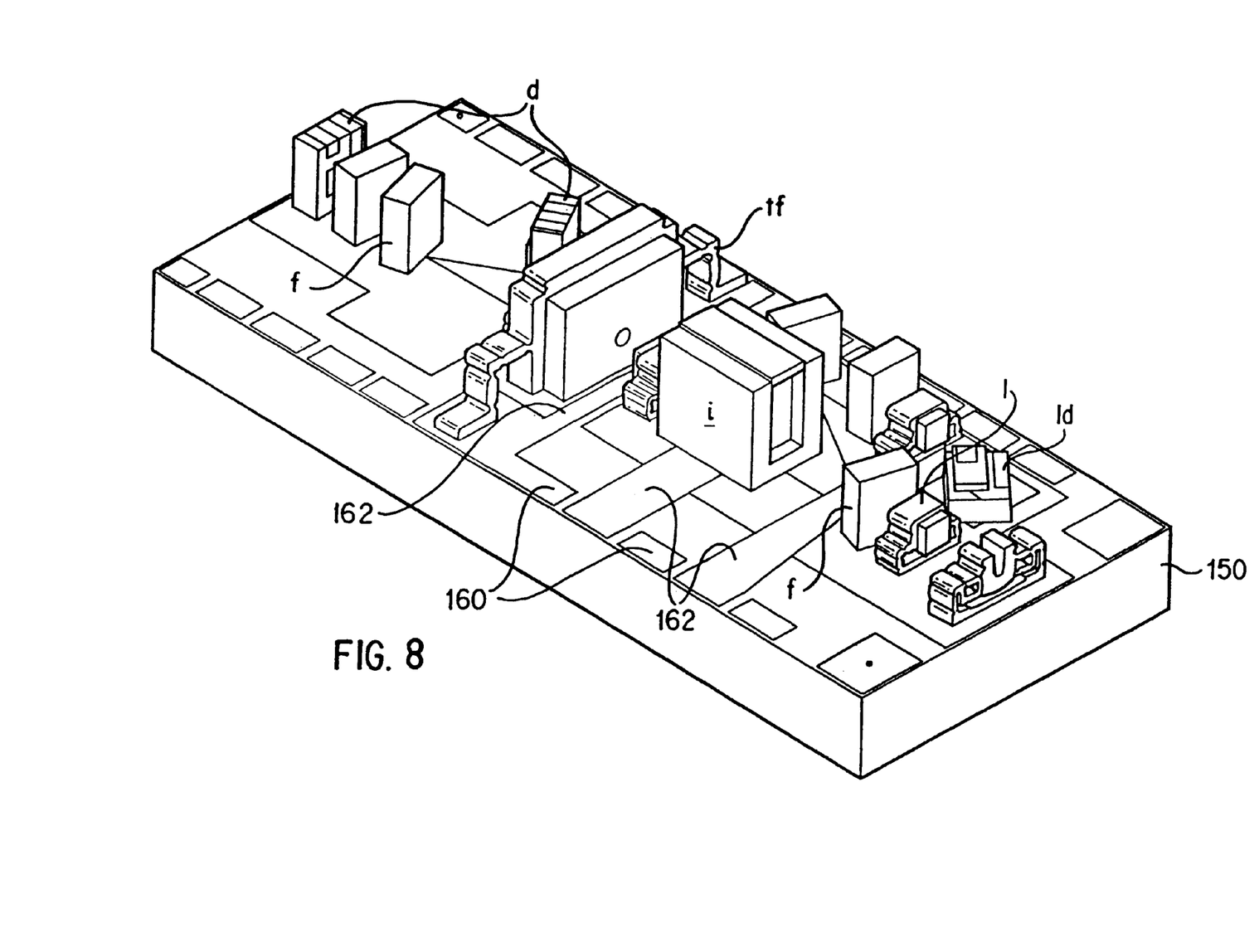
FIG. 8 is a perspective view showing the optical bench after the installation of the optical components and removal of the template substrate.

FIG. 8 illustrates the assembled optical system on the optical bench 150. In this example, the template substrate 102 has been removed.

Figure 9:
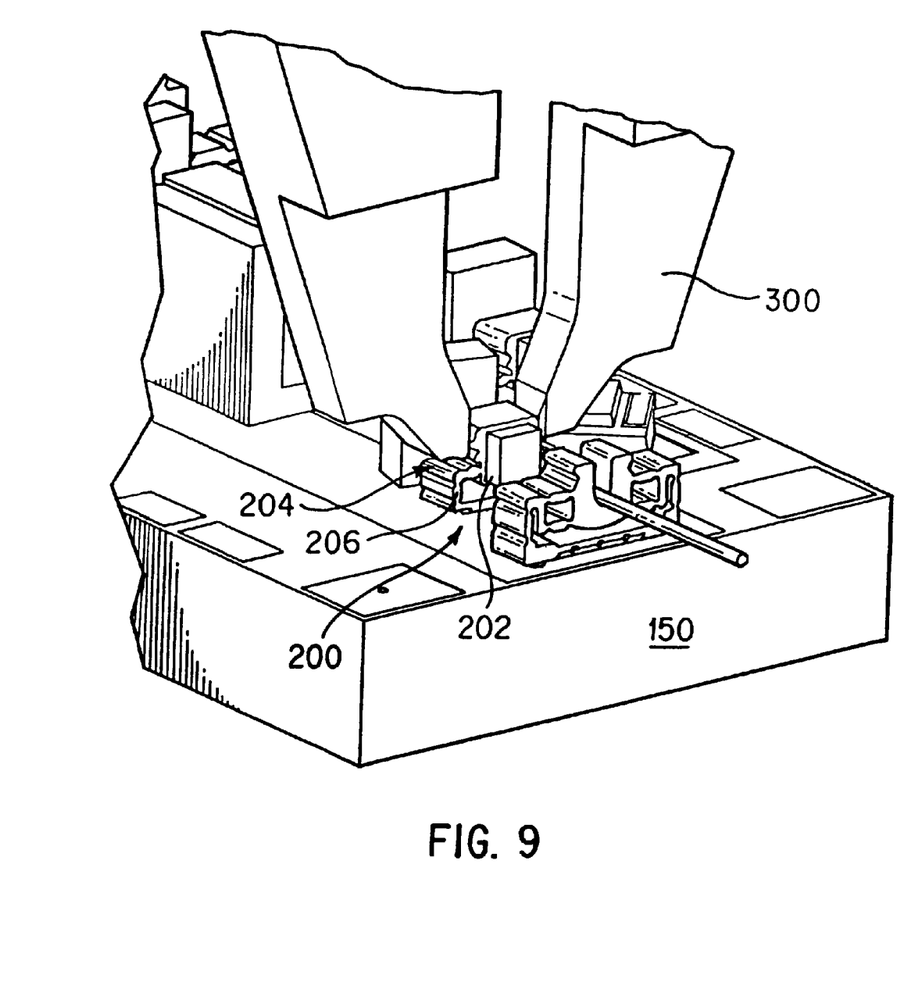
FIG. 9 is a close up perspective view showing the plastic deformation of the mounting structures of selected optical components to align the optical system on the optical bench.

As shown in FIG. 9, in some embodiments, the mounting structures 204 holding lens substrates 202 of the optical components 200 are aligned, after bench installation, by the plastic deformation of the associated mounting structures 204. In the illustrated example, this deformation is performed by alignment robot jaws 300 that cause plastic deformation of armatures 206 of the mounting structures 204 connecting the lens substrate 202 to the bench 150.

Figure 10:
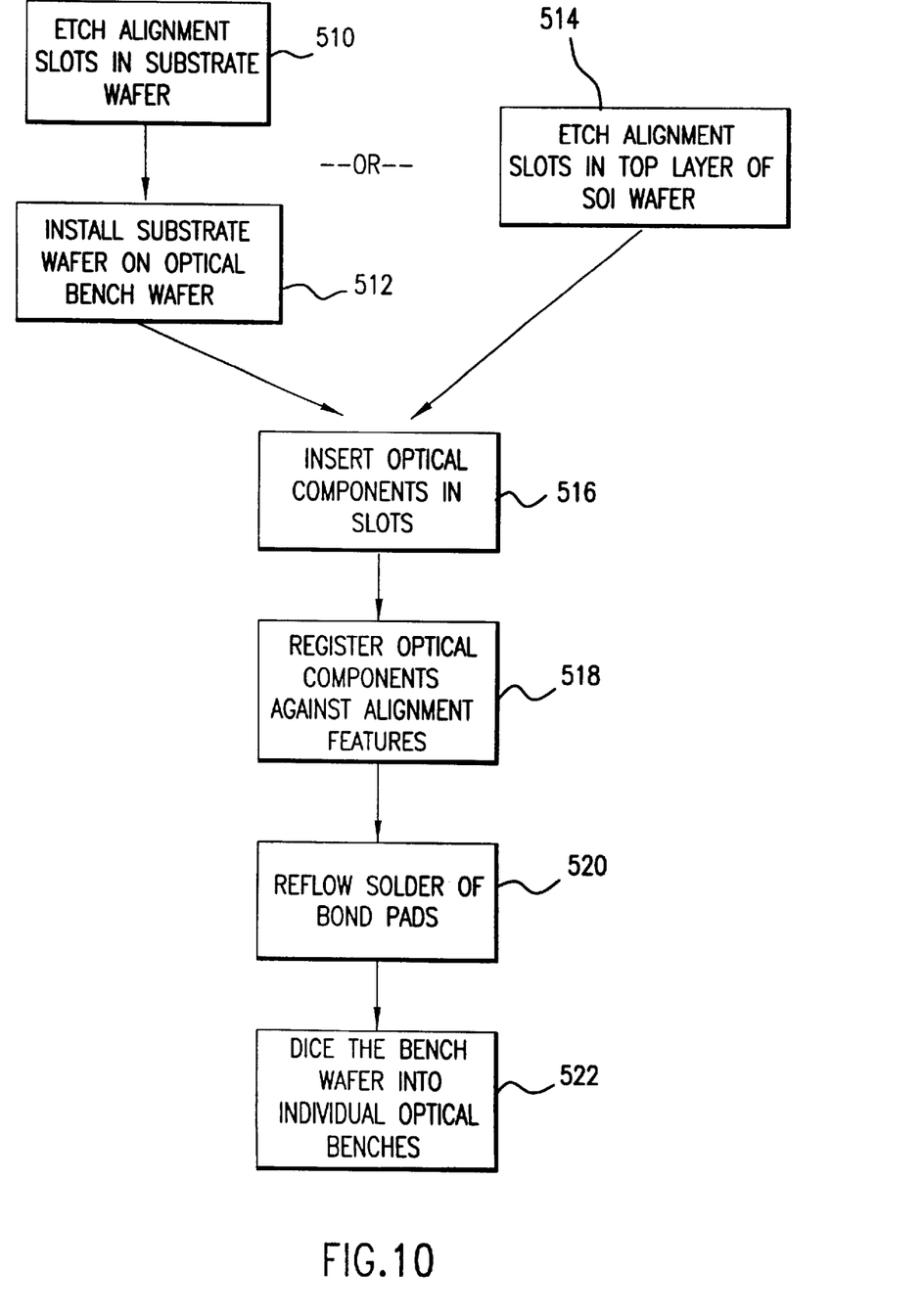
FIG. 10 is a flow diagram illustrating the inventive optical system fabrication process.

FIG. 10 is a flow diagram summarizing the optical system fabrication process according to the present invention.

First, the template substrate is installed on the optical bench.

In one example, this is performed at the wafer scale. Specifically, alignment slots 104 are formed in a template substrate wafer in step 510. The substrate wafer is then bonded to an optical bench wafer in step 512.

In another example, the substrate wafer and the bench wafer are assembled and the slots 104 subsequently formed in the substrate wafer as indicated by step 514. If an SOI structure is used, a HF dip is typically used to clear the buried oxide layer.

Next, the optical components 200 are inserted into the slots 104 in step 516. These optical components 200 are registered against the alignment features 120 of the reentrant sidewalls in step 518. The components are installed on bond material such as predeposited solder bond pads 154.

In step 520, a solder reflow process is performed. This step is typically performed in a solder reflow oven where the bond pads are heated to liquefy the solder and thus bond the optical components 200 to the bench 150 after resolidification. This step can be performed at the wafer level or with individual, singulated optical benches. Further, the solder reflow can be performed either with the template substrate attached, or the template substrate can be removed.

Finally, if wafer-level assembly is performed, the bench wafer is diced into the individual benches 150 in step 522. This singulation is achieved through die sawing in one embodiment or a cleave process can alternatively be used in combination with a scribe or etch step to locate the cleave.

While this invention has been particularly shown and described with references to preferred embodiments thereof, it will be understood by those skilled in the art that various changes in form and details may be made therein without departing from the scope of the invention encompassed by the appended claims.

What is claimed is:

1. A template system for optical systems including optical benches and optical components, which are bonded to the benches, the template system comprising:

a substrate over the optical bench, the substrate having an alignment slot formed through the substrate, the alignment slot having an alignment feature against which an optical component is registered and a reentrant sidewall extending from the alignment feature into the substrate.

2. A template system as claimed in claim 1, wherein the optical component comprises an optical element and a mounting structure on which the optical element is positioned.

3. A template system as claimed in claim 2, wherein the mounting structure comprises at least one armature enabling plastic deformation of the alignment structure to align the optical element relative to the optical system.

4. A template system as claimed in claim 1, further comprising at least one metal bond pad on the bench, which is used to bond the optical component to the bench.

5. A template system as claimed in claim 4, wherein the bond pad comprises gold.

6. A template system as claimed in claim 4, wherein the bond pad comprises a solder alloy.

7. A template system as claimed in claim 1, wherein the substrate further comprises an electrical via providing access to electrical connections on the optical bench.

8. A template system as claimed in claim 7, wherein the electrical via comprises a hole in the substrate that is aligned with wire bond pads on the optical bench.

9. A template system as claimed in claim 7, wherein the electrical via comprises a conductive path from a side of the substrate adjacent to the optical bench to an upper side of the substrate.

10. A template system as claimed in claim 1, wherein the alignment feature is located at one end of the slot.

11. A template system as claimed in claim 1, wherein the alignment feature is located at a top of the slot.

12. A template system as claimed in claim 1, wherein the substrate is constructed from silicon wafer material.

13. A process for fabricating an optical system, comprising:
   depositing a bond pad on an optical bench;
   installing a substrate over the optical bench;
   forming an alignment slot in the substrate, the alignment slot having an alignment feature projecting into the slot from a slot sidewall;
   inserting an optical component through the alignment slot and placing the optical component onto the bond pad; and
   registering the optical component against the alignment feature.

14. A process as claimed in claim 13, wherein the step of depositing the bond pad comprises placing a solder preform on the bench.

15. A process as claimed in claim 13, wherein the step of depositing the bond pad comprises photolithographically patterning a metal layer on the optical bench.

16. A process as claimed in claim 13, wherein the step of installing the substrate over the optical bench comprises bonding a wafer of substrates to a wafer of optical benches.

17. A process as claimed in claim 16, wherein the step of installing the substrate over the optical bench further comprises thermally bonding the wafers together.

18. A process as claimed in claim 13, further comprising separating the wafer of optical benches into individual optical benches.

19. A process as claimed in claim 13, further comprising performing a reflow process to bond the optical component to the optical bench.

20. A process as claimed in claim 13, wherein the step of installing the substrate over the optical bench is performed after the step of forming the alignment slot in the substrate.

21. A process as claimed in claim 13, wherein the step of forming the alignment slot comprise reactive ion etching the slot into the substrate.

22. A template system as claimed in claim 1, wherein the alignment slot is formed through the substrate to expose a top surface of the bench, the reentrant sidewall extending from the alignment feature such that the alignment feature projects into the alignment slot.

* * * * *